(12) United States Patent
Szumski et al.

(10) Patent No.: US 10,336,125 B2
(45) Date of Patent: Jul. 2, 2019

(54) COMPOSITE LAMINATE ASSEMBLY USED TO FORM PLURAL INDIVIDUAL CARDS AND METHOD OF MANUFACTURING THE SAME

(71) Applicant: Illinois Tool Works Inc., Glenview, IL (US)

(72) Inventors: Daniel Mark Szumski, Saint John, IN (US); Matthew Robert Shields, Chicago, IL (US); William A. Herring, Valparaiso, IN (US)

(73) Assignee: Illinois Tool Works Inc., Glenview, IL (US)

( * ) Notice: Subject to any disclaimer, the term of this patent is extended or adjusted under 35 U.S.C. 154(b) by 673 days.

(21) Appl. No.: 14/473,656

(22) Filed: Aug. 29, 2014

(65) Prior Publication Data
US 2015/0125670 A1    May 7, 2015

Related U.S. Application Data

(60) Provisional application No. 61/900,128, filed on Nov. 5, 2013.

(51) Int. Cl.
*B32B 37/24*     (2006.01)
*B32B 38/00*     (2006.01)
(Continued)

(52) U.S. Cl.
CPC ............ *B42D 25/373* (2014.10); *B32B 37/24* (2013.01); *B32B 38/145* (2013.01);
(Continued)

(58) Field of Classification Search
None
See application file for complete search history.

(56) References Cited

U.S. PATENT DOCUMENTS

| 6,082,778 A * | 7/2000 | Solmsdorf | ........... G03H 1/0256 |
| | | | 283/107 |
| 2002/0130186 A1* | 9/2002 | Lasch | ...................... B32B 37/10 |
| | | | 235/488 |

(Continued)

FOREIGN PATENT DOCUMENTS

| CN | 1187655 C | 6/2001 |
| CN | 101401106 A | 4/2009 |

(Continued)

OTHER PUBLICATIONS

ISR and WO for PCT/US2014/055531 dated Feb. 2, 2015 (11 pgs.).

*Primary Examiner* — Laura C Powers
(74) *Attorney, Agent, or Firm* — Christopher R. Carroll; The Small Patent Law Group LLC (57) ABSTRACT

A laminated core stock sheet for use in a composite laminate assembly configured for being separated into plural individual cards is provided. The laminated core stock sheet includes a core substrate layer and an intermediate filmic layer coupled to the core substrate layer. The intermediate filmic layer includes plural conductive bodies spaced apart from each other that provide at least one of a security feature, a decorative feature, or other functional feature of the individual cards. The core substrate layer and the intermediate filmic layer are configured to be coupled with another laminated core stock sheet that may or may not include the intermediate filmic layer to form the composite laminate assembly configured for being separated into the individual cards.

23 Claims, 4 Drawing Sheets

(51) Int. Cl.
*B42D 25/47* (2014.01)
*G06K 19/16* (2006.01)
*B42D 25/369* (2014.01)
*B42D 25/373* (2014.01)
*G06K 19/077* (2006.01)

(52) U.S. Cl.
CPC ............ B42D 25/369 (2014.10); B42D 25/47 (2014.10); G06K 19/07735 (2013.01); G06K 19/16 (2013.01); *B32B 2037/243* (2013.01); *Y10T 156/10* (2015.01); *Y10T 428/24851* (2015.01)

(56) References Cited

U.S. PATENT DOCUMENTS

| | | | |
|---|---|---|---|
| 2006/0283958 A1 | 12/2006 | Osterweil | |
| 2007/0211398 A1* | 9/2007 | Whitney | G06K 19/077 361/42 |
| 2008/0245865 A1* | 10/2008 | Mosteller | B42D 25/00 235/449 |

FOREIGN PATENT DOCUMENTS

| | | |
|---|---|---|
| EP | 2015232 A1 | 1/2009 |
| WO | 20070062170 A2 | 5/2007 |
| WO | 20070097775 A1 | 8/2007 |

* cited by examiner

COMPOSITE LAMINATE ASSEMBLY USED TO FORM PLURAL INDIVIDUAL CARDS AND METHOD OF MANUFACTURING THE SAME

CROSS-REFERENCE TO RELATED APPLICATIONS

This application claims priority to U.S. Provisional Application No. 61/900,128, which was filed on 5 Nov. 2013, and the entire disclosure of which is incorporated herein by reference.

BACKGROUND

The present disclosure relates to laminated sheets and cards that are manufactured from these sheets. Laminated sheets and cards are used in a variety of applications, such as financial transaction cards (e.g., credit or debit cards, phone cards, gift cards, loyalty cards, etc.), security cards (e.g., identification cards), and the like. Some known sheets and cards may be formed from multiple layers of plastic based substrates, holographic, metallized, printed or clear films or foils, adhesives and coatings, among other layers. The cards also may include printing, graphics, and/or other features.

In order to form various decorative, security, or other functional features of the cards, the cards and the sheets from which the cards are formed can include a metallized layer. Such a layer can be used to provide a holographic effect or feature, or another decorative feature, which can be used to distinguish between legitimate and counterfeit cards, or the like.

Electrostatic energy can pass through these metallized layers of the cards. For example, through routine or daily use of a financial transaction card by a user, electrostatic energy can pass through a metallized layer in the card that extends along the length of the card, from one end to an opposite end along the card. When the card is inserted into an electronic machine or device (e.g., a point of sale terminal), one or more portions of the metallized layer may contact the machine or device and conduct the electrostatic energy into the machine or device. Conducting this energy can be referred to as electrostatic discharge, or ESD. The ESD can damage the machine or device and prevent the machine or device from being used.

BRIEF DESCRIPTION

In one embodiment, a laminated core stock sheet for use in a composite laminate assembly configured for being separated into plural individual cards is provided. The laminated core stock sheet includes a core substrate layer and an intermediate filmic layer coupled to the core substrate layer. The intermediate filmic layer includes plural conductive bodies spaced apart from each other that provide at least one of a security feature, a decorative feature, or other functional feature of the individual cards. The core substrate layer and the intermediate filmic layer are configured to be coupled with another laminated core stock sheet that may or may not include the intermediate filmic layer to form the composite laminate assembly configured for being separated into the individual cards.

In one embodiment, a composite laminate assembly configured to be separated into plural individual cards is provided. The assembly includes a first laminated core stock sheet including a first core substrate layer and a first intermediate filmic layer coupled to the first core substrate layer. The first intermediate filmic layer includes plural conductive bodies spaced apart from each other that provide at least one of a security feature, a decorative feature, or other functional feature of the individual cards. The assembly also includes a second laminated core stock sheet including at least a second core substrate layer. The first laminated core stock sheet and the second laminated core stock sheet are configured to be laminated together. The assembly also includes a first overlay layer configured to be coupled with the first laminated core stock sheet, and a second overlay layer configured to be coupled with the second laminated core stock sheet such that the first and second laminated core stock sheets are disposed between the first overlay layer and the second overlay layer.

In one embodiment, a method (e.g., for manufacturing a composite laminate assembly useful in creating one or more individual cards) includes depositing a conductive material onto a continuous filmic web to form plural separate conductive bodies that are spaced apart from each other. The method also includes coupling the filmic web with the separate conductive bodies to a core substrate layer to form a first laminated core stock sheet. The first laminated core stock sheet is configured to be coupled with a second laminated core stock sheet that may or may not include the intermediate filmic layer to form the composite laminate assembly configured for being separated into the individual cards.

In one embodiment, a method (e.g., for forming a card from a laminate composite assembly) includes coupling a first laminated core stock sheet to a radio frequency identification (RFID) inlay layer and a second laminated core stock sheet to form the laminate composite assembly. The method also includes cutting one or more individual cards from the laminate composite assembly. The first laminated core stock sheet includes an intermediate filmic layer having plural conductive bodies spaced apart from each other. The filmic layer provides at least one of a security feature, a decorative feature, or other functional feature of the one or more individual cards. The one or more individual cards are cut from the laminate composite assembly such that the conductive bodies in the filmic layer in the one or more individual cards do not form a conductive pathway between two or more outer edges of the one or more individual cards.

BRIEF DESCRIPTION OF THE DRAWINGS

The present inventive subject matter will be better understood from reading the following description of non-limiting embodiments, with reference to the attached drawings (which are not necessarily drawn to scale), wherein below.

DETAILED DESCRIPTION

Figure 1:
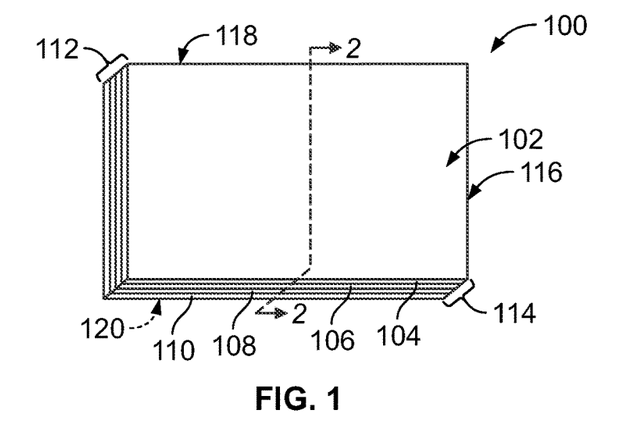
FIG. 1 is a schematic diagram of a laminated card formed in accordance with one or more embodiments of the inventive subject matter described herein.
Figure 2:
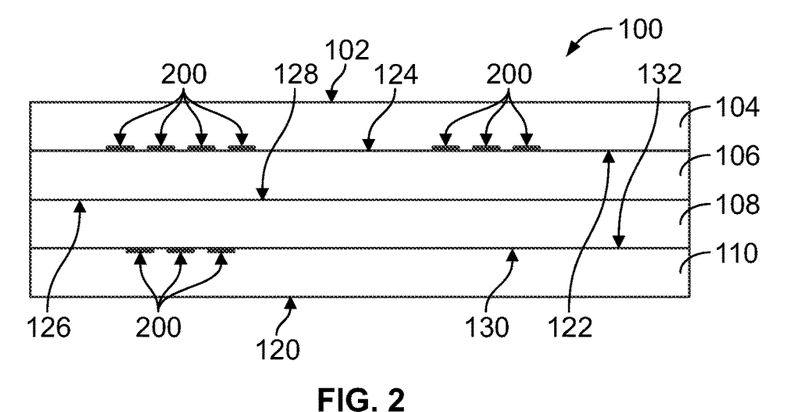
FIG. 2 is a cross-sectional view of the card along line 2-2 in FIG. 1.

FIG. 1 is a schematic diagram of a laminated card 100 formed in accordance with one or more embodiments of the inventive subject matter described herein. FIG. 2 is a cross-sectional view of the card 100 along line 2-2 in FIG. 1. The card 100 may be used in a variety of applications, such as a financial transaction card (e.g., credit or debit card, phone card, gift card, loyalty card, etc.), a security card (e.g., identification card), and the like. The card 100 includes a visible surface or side 124 (also referred to as an interface surface or side) on which information may be printed or otherwise shown. For example, the surface or side 124 may include text, numbers, images, and the like, that indicate a use of the card 100, an owner of the card 100, an institution that issued and/or accepts the card 100, or the like. The card 100 is formed from several planar sections of sheets that are laminated together. These planar sheet sections include overlay layers 104, 110 and core stock layers 106, 108. The core stock layers 106, 108 are coupled with each other and form the core or center of the card 100.

The overlay layers 104, 110 are coupled to the core stock layers 106, 108 and form the exterior sides of the card 100. The overlay layer 104 extends between an exposed, external, or exterior surface or side 102 and an opposite interface side 122. The core stock layer 106 extends between an interface side 124 to an opposite interface side 126. In the illustrated embodiment, the interface side 122 of the overlay layer 104 engages (e.g., abuts) the interface side 124 of the core stock layer 106. The core stock layer 108 extends from an interface side 128 to an opposite interface side 130. The interface side 126 of the core stock layer 106 can abut the interface side 128 of the core stock layer 108. The overlay layer 110 extends from the exterior surface or side 120 to an opposite interface side 130. The interface side 130 of the core stock layer 108 may abut the interface side 132 of the overlay layer 110.

Information such as text, images, and the like, can be printed on the outer surfaces of the core stock layers 106, 108 as printed material 200. For example, information can be printed on the side 124 of the core stock layer 106 and/or the side 130 of the core stock layer 108, such as an account number, name of the account holder, phone numbers, identifying information, and the like. The overlay layers 104, 110 may be placed onto the corresponding sides 124, 130 of the core stock layers 106, 108 to protect the information printed on the core stock layers 106, 108. The overlay layers 104, 110 may be formed from a nonconductive material, such as polyvinyl chloride (PVC), polyethylene terephthalate (PET), polycarbonate (PC), copolymerized PET (PETG), or the like. The overlay layers 104, 110 may vary in thickness and, in one embodiment, are at least two mils (e.g., 0.05 millimeters) thick. Alternatively, the overlay layers 104, 110 may be a smaller or larger thickness.

As described below, one or more of the core stock layers 106, 108 can include a filmic layer 302 having one or more conductive bodies. In one embodiment, only one of the core stock layers 106, 108 includes the filmic layer 302. Alternatively, both of the core stock layers 106, 108 may include the filmic layer 302. The filmic layer 302 can be used as a reflective and/or refractive layer of the card 100 that assists in decorating the card, verifying authenticity of the card, or the like. Also as described below, these conductive bodies can be arranged so that a conductive pathway between two or more edges of the card 100 does not exist. For example, even though the conductive body of bodies may extend across all or predominantly all of a planar surface of the core stock layer 106 and/or the core stock layer 108, the conductive body or bodies may not form a conductive pathway that extends from one edge 112, 114, 116, 118 of the card 100 to another edge 112, 114, 116, 118 of the card 100. The edges 112, 114, 116, 118 extend from one side or surface 102 of the card 100 to the opposite side or surface 120 of the card 100. The lack of such a conductive pathway allows for the card 100 to include a reflective layer for decorating the card, verifying the authenticity of the card, or the like, while avoiding discharge of ESD from the card 100.

Figure 3:
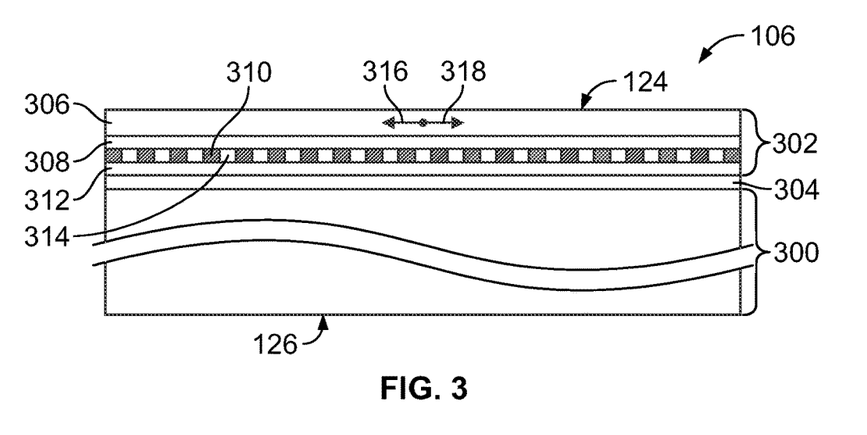
FIG. 3 is a cross-sectional view of a core stock layer shown in FIG. 1 according to one embodiment of the inventive subject matter described herein.

FIG. 3 is a cross-sectional view of the core stock layer 106 shown in FIG. 1 according to one embodiment of the inventive subject matter described herein. While the drawing in FIG. 3 illustrates the core stock layer 106, this same drawing also may represent the core stock layer 108. The core stock layer 106 includes several layers (e.g., films) laminated together. These layers include a core substrate layer 300 that may include or be formed from one or more dielectric films, such as PET, PVC, PC, PETG, acrylic, Teslin™, or the like. The core substrate layer 300 is coupled to a conductive filmic layer 302 by an adhesive layer 304. The core substrate layer 300 is shown as being substantially thicker than the other layers in the core stock layer, but alternatively may have a different thickness. The adhesive layer 304 is formed from one or more materials that couple the core substrate layer 300 to the filmic layer 302 to prevent the filmic layer 302 from being separated from the core substrate layer 300.

The filmic layer 302 includes a supporting film 306 having an emboss coating layer 308 with plural spaced apart conductive bodies 310 disposed thereon. A tie coat layer 312 is coupled with the conductive bodies 310 and the adhesive layer 304 that binds the filmic layer 302 to the core substrate layer 300. The tie coat layer 312 binds the adhesive layer 304 to the conductive bodies 310. The conductive bodies 310 are laterally spaced apart from each other by separation gaps 314. For example, the conductive bodies 310 are laterally spaced apart such that the bodies 310 do not engage or touch one another (e.g., there is no conductive pathway between the conductive bodies 310) in lateral directions 316, 318 that are oriented parallel to a plane defined by the side 126 or the side 124. The conductive bodies 310 may be spaced apart in directions that are oriented from one edge 112 (shown in FIG. 1) of the card 100 that includes the core stock layer 106 to the opposite edge 116 (shown in FIG. 1) of the card 100. Additionally or alternatively, the conductive bodies 310 may be spaced apart from each other in directions that are oriented from the edge 114 (shown in FIG. 1) of the card 100 to the opposite edge 118 (shown in FIG. 1) of the card 100.

The conductive bodies 310 of the filmic layer 302 can be reflective to provide a security feature, a functional feature, a decorative feature, and/or another feature for the card 100. For example, the conductive bodies 310 can provide a reflective layer used in a mirror or holographic layer of the card 100 that assists in decorating the card, verifying authenticity of the card, or the like. In one aspect, the conductive bodies 310 are formed from a metal or metal alloy, such as aluminum. Optionally, another type of metal or metal alloy, or one or more additional metals or metal alloys may be used to form the conductive bodies 310.

The supporting layer 306 supports the emboss coating layer 308 and the conductive bodies 310 when the conductive bodies 310 are formed on the emboss coating layer 308, as described below. The supporting layer 306 also may be referred to as a carrier or printable layer. Images, text, and the like, representative of the card, the owner of the card, a financial institution, or the like, can be printed onto this layer 306. In one aspect, the layer 306 includes or is formed from two-sided print treated PET, but optionally may include or be formed from PVC, PC, PETG, acrylic, or another type of material. The layer 308 may be an embossable layer capable of being deformed by one or more male and/or female roller dies to create a raised (or lowered) design (or relief).

The emboss coating layer 308 can include a non-conductive coating disposed on the supporting film 306 allows indicia (e.g., an image, text, or the like) to be embossed into or out of the card 100 that includes the core stock layer 106. The emboss coating layer 308 can resist melting or flowing when exposed to relatively high temperatures. Additionally or alternatively, the emboss coating layer 308 may operate as an adhesive to bond the supporting layer 306 to the conductive bodies 310.

Figure 4:
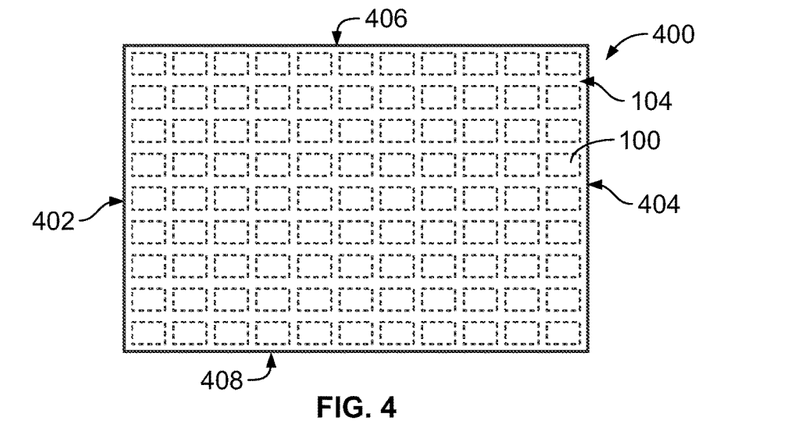
FIG. 4 is a top view of a composite laminate assembly from which several cards may be formed in accordance with one embodiment.

FIG. 4 is a top view of a composite laminate assembly 400 from which several cards 100 may be formed in accordance with one embodiment. The laminate assembly 400 laterally extends between opposite edges 402, 404 along one direction and laterally extends between opposite edges 406, 408 along a perpendicular direction. The laminate assembly 400 may have a similar cross-section as the cross-section of the card 100 shown in FIG. 2. For example, the laminate assembly 400 may have a lower print or overlay layer 110 (shown in FIG. 2 but not visible in FIG. 4) coupled to core stock layers 106, 108 (shown in FIG. 2 but not visible in FIG. 4), which are coupled to an upper print or overlay layer 104. The sections of the layers 104, 106, 108, 110 that are included in the card 100 shown in FIG. 2 may be smaller (e.g., not as wide) than the layers 104, 106, 108, 110. For example, the layers 104, 106, 108, 110 shown in FIG. 2 may be subsets or segments of the layers 104, 106, 108, 110 in the laminate assembly 400. Several individual cards 100 may be cut from the laminate assembly 400. For example, the cards 100 may be cut through an entire thickness of the laminate assembly 400. The number and/or arrangement of the cards 100 shown in FIG. 4 are provided merely as one non-limiting example.

Returning to the description of the card 100 shown in FIG. 2, the filmic layer 302 may be buried in the card 100 and/or in the assembly 300 from which cards are cut or otherwise formed. By "buried," it is meant that the filmic layer 302 is disposed sufficiently far into the bulk of the body of the card 100 from the exposed surface or side 102, 120 that is closest to the filmic layer 302 that the filmic layer 302 is not at or relatively close to this exposed surface or side 102, 120. The filmic layer 302 may not be visible along the exposed surface or sides 102, 120 of the card 100. For example, the filmic layer 302 may be more than two mils (e.g., 0.05 millimeters) from the exterior surface or side 102, 120 that is closest to the filmic layer 302. While portions of the filmic layer 302 may be visible along one or more of the edges 112, 114, 116, 118 (shown in FIG. 1) of the card 100 and/or one or more of the edges 402, 404, 406, 408 (shown in FIG. 4) of the laminate assembly 400 (shown in FIG. 4).

In one aspect, the filmic layer 302 may be buried far enough into the card 100 such that, even if information were to be magnetically stored in the layer 302, this information could not be magnetically read from the filmic layer 302. For example, while some cards may have magnetic stripes at or near an exposed surface 102, 120 of the cards and these strips are used to obtain information from the cards, the filmic layer 302 may be sufficiently far into the card 100 that the filmic layer 302 cannot have information magnetically stored therein that can be magnetically read from the external surface 102, 120 of the card. As described below, however, in one embodiment, the card may include a radio frequency identification (RFID) device that may transmit and/or receive electromagnetic waves through the filmic layer 302 to communicate with an RFID device that is located outside of the card. Additionally or alternatively, the filmic layer 302 may not store any information. For example, in contrast to a magnetic stripe of a transaction card, the filmic layer 302 may not magnetically (or otherwise) store any information about the card owner, the card, an account, or the like.

Figure 5:
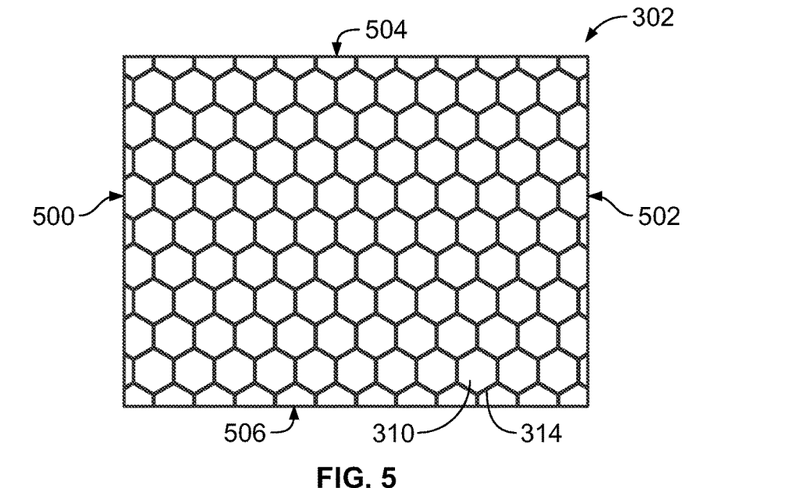
FIG. 5 is a top view of a filmic layer shown in FIG. 3 in accordance with one example embodiment.

FIG. 5 is a top view of the filmic layer 302 in accordance with one example embodiment. The filmic layer 302 shown in FIG. 5 may represent the filmic layer 302 in the laminate assembly 400 (shown in FIG. 4) or the filmic layer 302 in the card 100 (shown in FIG. 1). For example, an outer edge 500 of the filmic layer 302 may be part of (e.g., coextensive with) the edge 402 (shown in FIG. 4) of the laminate assembly 400, an opposite outer edge 502 of the filmic layer 302 may be part of (e.g., coextensive with) the edge 404 (shown in FIG. 4) of the laminate assembly 400, an outer edge 504 of the filmic layer 302 may be part of (e.g., coextensive with) the edge 406 (shown in FIG. 4) of the laminate assembly 400, and an opposite outer edge 506 of the filmic layer 302 may be part of (e.g., coextensive with) the edge 408 (shown in FIG. 4) of the laminate assembly 400. Or, the edge 500 of the filmic layer 302 may be part of the edge 112 (shown in FIG. 1) of the card 100, the edge 502 of the filmic layer 302 may be part of the edge 116 (shown in FIG. 1) of the card 100, the edge 504 of the filmic layer 302 may be part of the edge 118 (shown in FIG. 1) of the card 100, and the edge 506 of the filmic layer 302 may be part of the edge 114 (shown in FIG. 1) of the card 100.

The filmic layer 302 includes the conductive bodies 310 separated from each other by the separation gaps 314, as described above. The conductive bodies 310 may have a variety of shapes, including the hexagonal shapes shown in FIG. 5. Alternatively, the conductive bodies 310 may have another shape. The conductive bodies 310 and/or separation gaps 314 may have various sizes and/or shapes, so long as a conductive pathway does not exist among, between, or through the conductive bodies 310 from one edge 112, 114, 116, 118 to another edge 112, 114, 116, 118 of the card 100 that includes the filmic layer 302 in order to prevent conduction of ESD through and out of the card 100.

The conductive bodies 310 may provide a reflective or mirrored surface for the filmic layer 302. Such a surface can be used to provide a security feature, decorative feature, or other functional feature of the card 100. For example, the filmic layer 302 may have a mirror surface that is used to create a hologram or holographic effect for the card 100.

Figure 6:
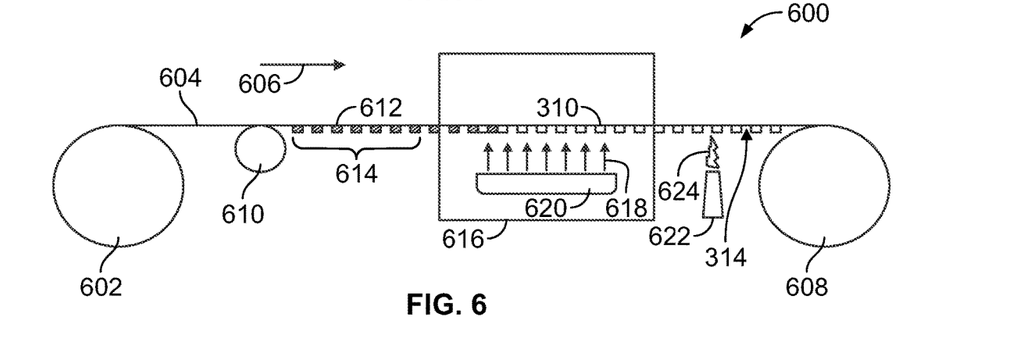
FIG. 6 is a schematic diagram of a selective metallization system used to create the filmic layer shown in FIG. 3 in accordance with one embodiment.

FIG. 6 is a schematic diagram of a selective metallization system 600 used to create the filmic layer 302 shown in FIG. 3 in accordance with one embodiment. The system 600 includes an unwind roller 602 that may have a continuous web 604 wound thereon. In one aspect, the web 604 may include or be formed from the supporting film 306 (shown in FIG. 3), or the supporting film 306 and the emboss coating layer 308 (shown in FIG. 3). By "continuous," it is meant that the web 604 extends for a longer length than may be needed to form the portion of the filmic layer 302 in the laminate assembly 400 (shown in FIG. 4). For example, the web 604 may be moved in a processing direction 606 through the system 600. The web 604 can have a length along this processing direction 606 that is longer than the length of the filmic layer 302 in the laminate assembly 400 from one edge 402 to the opposite edge 404 of the laminate assembly 400 and/or longer than the length of the filmic layer 302 in the laminate assembly 400 from the edge 406 to the opposite edge 408 of the laminate assembly 400.

The web 604 may be unwound or otherwise fed in the processing direction 606 and be collected onto a windup roller 608 after the conductive bodies 310 are deposited onto the web 604 to form the filmic layer 302. As the web 604 moves in the processing direction 606, a transfer roller 610 engages the web 604 and prints an evaporative material 612 onto the web 604. The transfer roller 610 may include one or more protrusions in the shape of the pattern 614. These protrusions may have the evaporative material 612 disposed thereon that is transferred to the surface of the web 604 as the transfer roller 610 engages the web 604 and the web 604 travels over (or below) the transfer roller 610. The evaporative material 612 is transferred onto the web 604 in the shape of the pattern 614. The evaporative material 612 can include or be formed from one or more oils that do not evaporate under room temperature conditions, but that may evaporate from the web 604 when exposed to elevated temperatures.

The pattern 614 in which the evaporative material 612 is printed onto the web 604 may be in the same arrangement as the separation gaps 314 (shown in FIG. 3) between the conductive bodies 310 (shown in FIG. 3) of the filmic layer 302 being formed by the web 604. With respect to the example of the conductive bodies 310 shown in FIG. 3, the pattern 614 may be formed on the web 605 in the shape of several connected hexagons. Other shapes and/or arrangements may be formed, however, and the pattern 614 of shapes that is formed on the web 604 may be a regularly repeating or randomly formed pattern 614. The pattern 614 is arranged to prevent the creation of any conductive pathways between the conductive bodies 310 between two or more edges of the card 100, as described above. For example, the pattern 614 may form a deposition mask that defines boundaries encircling areas of the web 604 where conductive material used to form the conductive bodies 310 will be deposited while preventing the conductive material from being deposited in locations where the pattern 614 is printed. These boundaries formed by the pattern 614 may entirely encircle one or more of these areas to form isolated islands of the web 604. These islands represent the locations where the conductive bodies 310 will be located. Because these boundaries completely encircle one or more (or a substantial percentage) of the islands, the conductive bodies 310 that eventually are formed in the islands are separated from each other by the separation gaps 314.

While transfer rolling is described as being used to deposit the evaporative material 612 onto the web 604 in the shape of the pattern 614, optionally, another type of deposition technique may be used. For example, the evaporative material 612 may be provided on the web 604 in the shape of the pattern 614 using pad printing, screen printing, gravure printing, ink jet printing, or the like.

The web 604 with the pattern 614 of evaporative material 612 passes over or through a selective metallization chamber 616 in which conductive material 618 is deposited on at least a portion of the web 604 to form the conductive bodies 310. The chamber 616 can represent a closed volume in which a reduced pressure atmosphere is created (e.g., a vacuum or near vacuum environment is maintained). Optionally, the chamber 616 may represent a volume that is open and through which the web 604 passes. For example, the system 600 may be disposed inside a larger vacuum chamber and the chamber 616 may represent a subsection of the vacuum chamber.

A container 620 of the conductive material 618 is disposed in the chamber 616. The conductive material 618 is heated to a sufficiently great temperature that the conductive material 618 evaporates from the container 620 and condenses on the web 604. During passage of the web 604 through the chamber 616, the conductive material 618 condenses and/or at least partially solidifies on the areas of the web 604 where the evaporative material 612 is not present in the pattern 614. For example, if the pattern 614 is in the shape of the separation gaps 314 between the hexagonal bodies 310 shown in FIG. 5, then the conductive material 618 condenses and/or at least partially solidifies on the web 604 in the shapes and/or sizes of the hexagonal bodies 310. Alternatively, the conductive material 618 may condense and solidify in another shape and/or arrangement.

The evaporative material 612 evaporates from the web 604 when exposed to the elevated temperatures in the chamber 616 and, in doing so, prevents the conductive material 618 from condensing and/or solidifying in the locations on the web 604 where the evaporative material 612 was printed onto the web 604. For example, if the pattern 614 is in the shape of the separation gaps 314 between the hexagonal bodies 310 shown in FIG. 3, then the conductive material 618 does not condense or solidify on the web 604 in the shapes and/or sizes of the separation gaps 314. Optionally, another size and/or arrangement of the separation gaps 314 and/or bodies 310 may be used in the pattern 614, as described above.

The evaporation of the evaporative material 612 allows the conductive material 618 to be selectively deposited or selectively metallized onto the web 604 in the shape, size, and/or arrangement of the conductive bodies 310 that are separated from each other by the separation gaps 314. In one aspect, use of the evaporative material 612 avoids the use of any operational steps that remove the conductive material 618 from the web 604 after the conductive material 618 is deposited (e.g., condensed) on the web 604. For example, instead of depositing the conductive material 618 onto locations of the web 604 where the separation gaps 314 are to be located and then caustically or otherwise removing the conductive material 618 from these locations, the conductive material 618 is never deposited onto the locations of the web 604 where the separation gaps 314 are to be located in one embodiment. Selectively depositing or metallizing the web 604 in this manner to form the conductive bodies 310 separated by the separation gaps 314 avoids the need for additional operational steps of removing at least some of the conductive material 618, washing materials used to remove the conductive material 618, and the like. Alternatively, the conductive bodies 310 may be formed by depositing the conductive material 618 onto the web 604 and then removing portions of the conductive material 618 in locations where the separation gaps 314 are to be located in order to form these separation gaps 314.

Following passage of the web 604 through the chamber 616, the conductive material 618 forms the conductive bodies 310 on the web 604. The supporting layer 306 supports and carries the conductive bodies 310 through the chamber 616 and toward the windup roller 608. In one aspect, the web 604 can be exposed to a corona device 622 to remove residual amounts of the evaporative material 612 on the web 600. For example, the corona device 622 may emit or otherwise generate a relatively low temperature corona discharge 624 at or near the web 604 and conductive bodies 310. This corona discharge 624 is generated to remove residual amounts of the evaporative material 612 left on the web 604 following deposition of the conductive material 618. Optionally, the web 604 may be exposed to plasma in a vacuum environment to remove the residual amounts of evaporative material 612. In one embodiment, the corona discharge 624 or plasma does not remove any of the conductive material 618 or conductive bodies 310, but only removes the evaporative material 612 left on the web 604 in order to clean the web 604.

The web 604 and conductive bodies 310 are then wound onto the windup roller 608. The web 604 can be removed from the windup roller 608 so that the tie coat layer 312 may be applied to the web 604 to maintain a continuous filmic web. This filmic web may be longer or otherwise larger than the portion of the filmic layer 302 that is included in the core stock layer 106 and/or 108 of the laminate assembly 400 (shown in FIG. 4). Alternatively, the tie coat layer 312 may be applied to the web 604 and conductive bodies 310 to form the continuous filmic web prior to the web 604 being wound onto the windup roller 608. Once the continuous filmic web is formed, the continuous filmic web may be divided (e.g., cut) into one or more sheets to form the portion of the filmic layer 302 that is included in the core stock layer 106 and/or 108 in the laminate assembly 400. The adhesive layer 304 can be applied to this portion of the filmic layer 302 so that the filmic layer 302 can be laminated to the core substrate layer 300 to form the core stock layer 106 or 108. This core stock layer 106 or 108 can then be laminated to another core stock layer 108 or 106 that does or does not include the filmic layer 302, and the core stock layers 106, 108 can be laminated to the overlay layers 104, 110 to form the laminate assembly 400. As described above, several cards 100 may then be cut from the laminate assembly 400.

Figure 7:
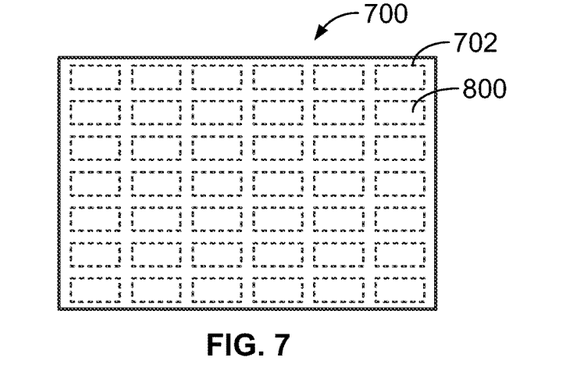
FIG. 7 is a top view of a filmic layer for use in a composite laminate assembly from which several cards may be obtained in accordance with another embodiment.
Figure 8:
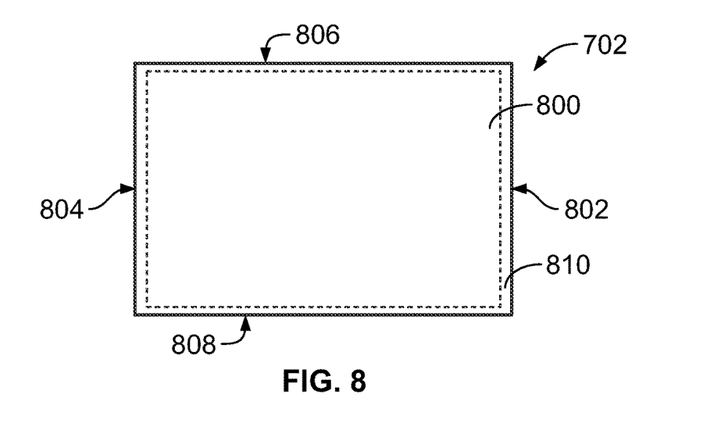
FIG. 8 is a top view of a card shown in FIG. 7.

FIG. 7 is a top view of a laminated sheet 700 for use in a composite laminate assembly from which several cards 702 may be obtained in accordance with another embodiment. FIG. 8 is a top view of a card 702 that may be cut from the laminated sheet 700 shown in FIG. 7. The laminated sheet 700 may include a filmic layer that is similar to the filmic layer 302 shown in FIG. 3. For example, the laminated sheet 700 may include core stock layers that are coupled with each other and overlay layers in order to form a composite laminate assembly (e.g., the laminated sheet 700). Several cards 702 can be cut from this laminate assembly, similar to the cards 100 being cut from the laminate assembly 400 (shown in FIG. 4). One difference between the filmic layer in the laminated sheet 700 and the filmic layer 302 is in the size and/or arrangement of conductive bodies in the filmic layers 302, 700, as described below.

As described above, the filmic layer 302 (shown in FIG. 3) in the laminate assembly 400 includes several conductive bodies 310 (shown in FIG. 3) arranged and spaced apart from each other such that the various cards 100 (shown in FIG. 1) that are cut from the laminate assembly 400 include multiple conductive bodies 310. These multiple conductive bodies 310 within a single card 100 are buried within the body of the card 100 (e.g., away from the surface of the card 100) and spaced apart from each other to prevent creation of a conductive pathway that extends between two or more edges of the cards 100. In contrast, the laminate assembly 700 includes a filmic layer having different sized and/or arranged conductive bodies in the cards 702. For example, as shown in FIG. 8, a card 702 may have a conductive body 800 that is larger than the conductive bodies 310 of the card 100, yet does not provide a conductive pathway between two or more outer edges 802, 804, 806, 808 of the card 702. While only a single conductive body 800 is included in the card 702 shown in FIG. 8, the portion of the laminated sheet 700 that is included in the card 702 may include several conductive bodies 800 that are connected to form a larger conductive body.

The conductive bodies 800 may be formed in the laminated sheet 700 similar to as described above in connection with the filmic layer 302. For example, the conductive bodies 800 may be formed by a selective metallization process that prints a pattern of evaporative material on a web to prevent deposition of the conductive bodies 800 on designated areas of the web. Alternatively, the conductive bodies 800 may be formed in another manner. As shown in FIG. 7, in one example, several relatively large conductive bodies 800 can be formed in the laminated sheet 700. These conductive bodies 800 may be sized, shaped, and arranged in the laminated sheet 700 such that the cards 702 can be cut from the composite laminate assembly (that includes the laminated sheet 700) so that the cards 702 are slightly larger than the conductive bodies 800. As shown in FIG. 7, the conductive bodies 800 can be deposited in the filmic layer 702 in a spaced apart manner to allow for the cards 702 to be cut from the composite laminate assembly that includes the laminated sheet 700. The dashed lines in FIG. 7 illustrate the edges 802, 804, 806, 808 of the cards 702.

For example, as shown in FIG. 8, the perimeter of the card 702 that is defined by the outer edges 802, 804, 806, 808 may be slightly larger than the conductive body 800 in the card 702. The larger perimeter of the card 702 forms a non-conductive boundary 810 around the conductive body 800. This boundary 810 frames the conductive body 800 such that the conductive body 800 is entirely contained within the boundary 810 and does not extend outside of the boundary 810 in one embodiment. The boundary 810 completely encircles and extends around the entire perimeter of the conductive body 800. As a result, the conductive body 800 cannot form or otherwise provide a conductive pathway between any two or more edges 802, 804, 806, 808 of the card 702. As described above, preventing such a conductive pathway from being formed prevents conduction of ESD through and out of the card 702.

Figure 9:
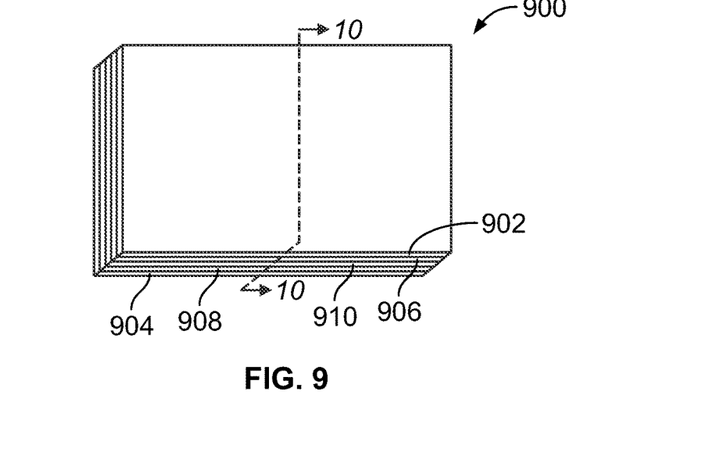
FIG. 9 is a schematic diagram of a laminated card formed in accordance with another embodiment.
Figure 10:
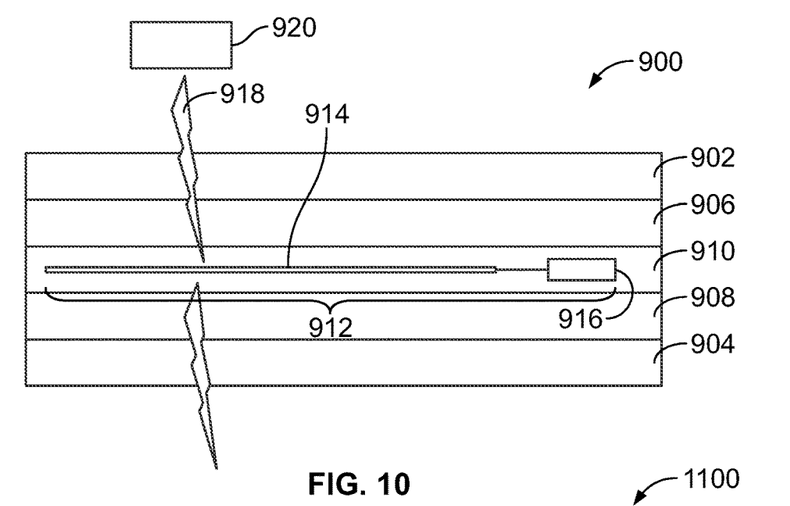
FIG. 10 is a cross-sectional view of the card along line 10-10 in FIG. 9.

FIG. 9 is a schematic diagram of a laminated card 900 formed in accordance with another embodiment. FIG. 10 is a cross-sectional view of the card 900 along line 10-10 in FIG. 9. Similar to the card 100 shown in FIG. 1, the card 900 may be used in a variety of applications, such as a financial transaction card (e.g., credit or debit card, phone card, gift card, loyalty card, etc.), a security card (e.g., identification card), and the like. The card 900 is formed from several planar sections of sheets that are laminated together. These planar sheet sections can include overlay layers 902, 904 that may be similar or identical to the overlay layers 104, 110 shown in FIG. 1 and core stock layers 906, 908 that may be similar or identical to the core stock layers 106, 108 shown in FIG. 1. Each of the core stock layer 906, 908 is coupled to a different overlay layer 902, 904. As described above, the overlay layers 902, 904 form the exterior sides of the card 900. Also as described above, one or more of the core stock layers 906, 908 can include a filmic layer such as the filmic layer 302 or 700 (shown in FIGS. 3 and 7) having one or more conductive bodies, which can be used as a reflective and/or conductive layer used in a holographic layer of the card 900 that assists in decorating the card, verifying authenticity of the card, or the like.

One difference between the card 100 shown in FIG. 1 and the card 900 shown in FIG. 9 is the inclusion of a RFID inlay layer 910 in the card 900. In the illustrated embodiment, the RFID inlay layer 910 is disposed between the core stock layers 906, 908. For example, the RFID inlay layer 910 may be sandwiched between and coupled to the core stock layers 906, 908. The RFID inlay layer 910 may include or be formed from one or more non-conductive materials, such as PVC, PC, PET, PETG, and the like.

Disposed within the RFID inlay layer 910 of the card 900 is an RFID device 912. The RFID device 912 includes an RFID antenna 914 and an RFID tag 916 that are used for wirelessly communicating with one or more external devices 920. For example, the RFID device 912 may be interrogated by and communicate with an external RFID reader 920 that generates an electromagnetic field and/or electromagnetic waves. These electromagnetic fields and/or waves are received by the RFID antenna 914 to power the RFID tag 916. Optionally, the RFID device 912 may be powered by a separate power source. The RFID tag 916 can cause the RFID antenna 914 to wirelessly transmit electromagnetic waves 918 back to the RFID reader 920. In the illustrated example, the RFID antenna 914 may transmit the waves 918 through the core stock layer 906 and/or 908. If one or more of the core stock layers 906, 908 includes the filmic layer 302 having one or more conductive bodies 310 extending over substantially all of the filmic layer 302 (as described herein), the electromagnetic waves communicated to the RFID antenna 914 and/or the electromagnetic waves communicated from the RFID antenna 914 may pass through the filmic layer. The RFID device 912 can be used to conduct a transaction with the card 900, provide identification information about the owner of the card 900, authenticate the legitimacy of the card 900, and the like.

For example, the conductive bodies 310 (shown in FIG. 3) in the filmic layer 302 that is between the RFID antenna 914 in the card 900 and the RFID reader 920 may be spaced apart from each other so that the electromagnetic waves 918 are able to pass through the filmic layer 302. For example, the spacing apart of the conductive bodies 310 can provide the filmic layer 302 with a low optical density that permits a relatively large range of frequencies of electromagnetic waves to pass through the filmic layer 302 from the RFID reader 920 to the antenna 914, from the antenna 914 to the RFID reader 920, or both from the RFID reader 920 to the antenna 914 and from the antenna 914 to the RFID reader 920.

The separation of the conductive bodies 310 in the filmic layer 302 can permit for relatively low frequency electromagnetic waves 918 to pass through the filmic layer 302 (and be received by the antenna 914 or the external RFID device 920, depending on which is generating the waves). For example, due to the separation of the conductive bodies 310, the RFID device 912 may be able to communicate (e.g., transmit, receive, or both transmit and receive) electromagnetic waves 918 having sub-gigahertz frequencies or less. In one embodiment, the RFID device 912 may be able to communicate electromagnetic waves 918 having frequencies of 20 megahertz or less. Optionally, the RFID device 912 may be able to communicate electromagnetic waves 918 having other frequencies through the filmic layer 302. As a result, the card 900 may include a reflective or mirrored surface of the filmic layer 302 for security, decorative, or other functional features, while also permitting an RFID device 912 in the card 900 to communicate through the filmic layer 302 with one or more external devices (e.g., the reader 920).

Figure 11:
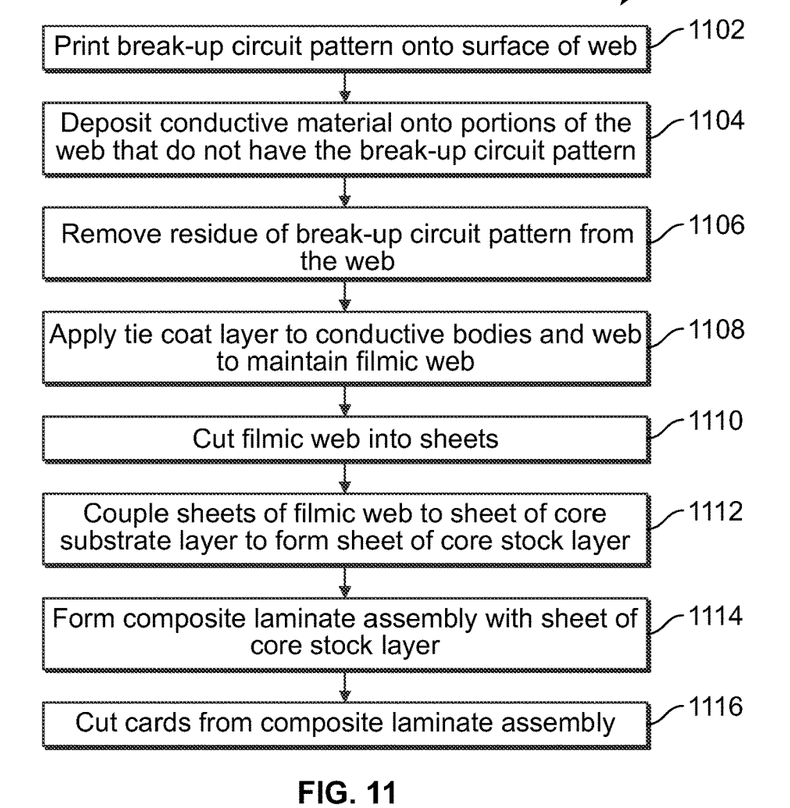
FIG. 11 illustrates a flowchart of a method for manufacturing cards in accordance with one embodiment.

FIG. 11 illustrates a flowchart of a method 1100 for manufacturing cards in accordance with one embodiment. The method 1100 may be used to create one or more of the cards described herein, to create one or more of the composite laminate assemblies described herein, or to create both the cards and the composite laminate assemblies. At 1102, a break-up circuit pattern is printed onto a web. For example, the evaporative break-up circuit pattern 614 (shown in FIG. 6) formed from the evaporative material 612 (shown in FIG. 6) may be printed onto one side of the web 604 (shown in FIG. 6). This pattern 614 may match the locations of the separation gaps that are formed between conductive bodies in a filmic layer formed from the web, as described above.

At 1104, conductive material is deposited onto the web in locations where the break-up circuit pattern is not located. For example, those portions of the web 604 that did not have the evaporative material 612 printed thereon may receive conductive material that forms the conductive bodies 310 (shown in FIG. 3). The portions of the web 604 that do include the evaporative material 612 printed thereon do not receive the conductive material and the conductive bodies 310 are not formed in these portions.

At 1106, residue from the pattern that is printed on the web is removed. For example, the web 604 may be exposed to a corona treatment, heat, a liquid wash or etchant, or the like, to remove the evaporative material 612 used to form the pattern 614 and that was not removed during deposition of the conductive bodies 310. Alternatively, the web 604 may not be exposed to any such treatment.

At 1108, a tie coat layer is applied to the conductive bodies and the web to maintain the filmic web. For example, formation of the filmic layer can be completed by applying the tie coat layer while the filmic layer is still in the form of a continuous web. Optionally, the filmic layer may be maintained without the tie coat layer. The tie coat layer can be applied to the web so that the tie coat layer extends over all or substantially all of the conductive bodies and the portions of the web that do not have conductive bodies deposited thereon.

At 1110, the filmic web can be coupled to one or more sheets of a core substrate layer to form one or more sheets of a core stock layer. For example, the adhesive layer 304 (shown in FIG. 3) may be applied to the tie coat layer 312 (shown in FIG. 3) and the core substrate layer 300 (shown in FIG. 3) may be coupled thereto to form the core stock layer, as described above.

At 1112, the laminated filmic web is cut into one or more smaller sheets. For example, the filmic web may be cut into sheets that are larger than the portions of the filmic web that eventually are included in the individual cards, but that also are smaller than the continuous web on which the conductive bodies were deposited.

At 1114, a composite laminate assembly is formed from one or more of the sheets of the core stock layer. For example, a sheet of the core stock layer having the filmic layer can be coupled with another core stock layer having another filmic layer, a core stock layer that does not include the filmic layer, an RFID inlay, an overlay layer, or a combination of two or more of these layers. The combination of these layers can form one or more of the composite laminate assemblies described herein.

At 1116, one or more cards (e.g., cards 100, 700, 900) are cut from the composite laminate assembly. In an embodiment where the cards are to include RFID devices, the composite laminate assembly may include several RFID devices spaced apart from each other so that the cards may be cut from the composite laminate assembly such that each card includes at least one RFID device.

In one embodiment, a laminated core stock sheet for use in a composite laminate assembly configured for being separated into plural individual cards is provided. The laminated core stock sheet includes a core substrate layer and an intermediate filmic layer coupled to the core substrate layer. The intermediate filmic layer includes plural conductive bodies spaced apart from each other that provide at least one of a security feature, a decorative feature, or other functional feature of the individual cards. The core substrate layer and the intermediate filmic layer are configured to be coupled with another laminated core stock sheet that may or may not include the intermediate filmic layer to form the composite laminate assembly configured for being separated into the individual cards.

In one aspect, the plural conductive bodies are spaced apart from each other within the intermediate filmic layer such that the intermediate filmic layer prevents conduction of electrostatic discharge (ESD) through the intermediate filmic layer and outside of the individual cards.

In one aspect, the intermediate filmic layer extends over all or substantially all of a planar surface area of the core substrate layer.

In one aspect, the intermediate filmic layer has a reflective mirror surface.

In one aspect, the plural conductive bodies of the intermediate filmic layer are configured to permit electromagnetic waves that are wirelessly communicated with radio frequency identification (RFID) devices disposed inside the individual cards through the intermediate filmic layer.

In one aspect, the intermediate filmic layer is configured to not inhibit the electromagnetic waves having sub-gigahertz frequencies from passing through the intermediate filmic layer. For example, the information, data, message, or the like, that is included in or represented by the electromagnetic waves may be received by an RFID interrogator device after the electromagnetic waves pass through the intermediate filmic layer.

In one aspect, the plural conductive bodies of the intermediate filmic layer are spaced apart from each other within the intermediate filmic layer such that the intermediate filmic layer also prevents conduction of electrostatic discharge (ESD) through the intermediate filmic layer and outside of the individual cards.

In one embodiment, a composite laminate assembly configured to be separated into plural individual cards is provided. The assembly includes a first laminated core stock sheet including a first core substrate layer and a first intermediate filmic layer coupled to the first core substrate layer. The first intermediate filmic layer includes plural conductive bodies spaced apart from each other that provide at least one of a security feature, a decorative feature, or other functional feature of the individual cards. The assembly also includes a second laminated core stock sheet including at least a second core substrate layer. The first laminated core stock sheet and the second laminated core stock sheet are configured to be laminated together. The assembly also includes a first overlay layer configured to be coupled with the first laminated core stock sheet, and a second overlay layer configured to be coupled with the second laminated core stock sheet such that the first and second laminated core stock sheets are disposed between the first overlay layer and the second overlay layer.

In one aspect, the plural conductive bodies of the first intermediate filmic layer are spaced apart from each other within the first intermediate filmic layer such that the first intermediate filmic layer prevents conduction of electrostatic discharge (ESD) through the first intermediate filmic layer and outside of the individual cards.

In one aspect, the first intermediate filmic layer is buried beneath the first overlay layer.

In one aspect, the first intermediate filmic layer is buried at least one mil beneath the first overlay layer.

In one aspect, the first intermediate filmic layer extends between all or substantially all of planar surface areas of the first laminated core stock sheet and the first overlay layer.

In one aspect, the first intermediate filmic layer has a reflective mirror surface.

In one aspect, the assembly also includes a radio frequency identification (RFID) inlay layer disposed between the first laminated core stock sheet and the second laminated core stock sheet. The RFID inlay layer includes one or more RFID devices.

In one aspect, the plural conductive bodies of the first intermediate filmic layer are configured to permit electromagnetic waves communicated with the RFID device to wirelessly pass through the first intermediate filmic layer, such as at sub-gigahertz frequencies.

In one aspect, the plural conductive bodies of the first intermediate filmic layer are spaced apart from each other within the first intermediate filmic layer such that the first intermediate filmic layer also prevents conduction of electrostatic discharge (ESD) through the first intermediate filmic layer and outside of the individual cards.

In one aspect, the second laminated core stock sheet also includes a second intermediate filmic layer coupled to the second core substrate layer. The second intermediate filmic layer includes plural conductive bodies spaced apart from each other that also provide at least one of a security feature, a decorative feature, or other functional feature of the individual cards.

In one embodiment, a method (e.g., for manufacturing a composite laminate assembly useful in creating one or more individual cards) includes depositing a conductive material onto a continuous filmic web to form plural separate conductive bodies that are spaced apart from each other. The method also includes coupling the filmic web with the separate conductive bodies to a core substrate layer to form a first laminated core stock sheet. The first laminated core stock sheet is configured to be coupled with a second laminated core stock sheet that may or may not include the intermediate filmic layer to form the composite laminate assembly configured for being separated into the individual cards.

In one aspect, the method also includes printing an evaporative break-up circuit pattern onto the continuous filmic web with an evaporative material. The conductive material can be deposited onto the filmic web in locations where the evaporative break-up circuit pattern is not present. The evaporative break-up circuit pattern prevents the conductive material from being deposited onto the filmic web in locations where the evaporative break-up circuit pattern is present.

In one aspect, the conductive material is deposited onto the locations of the filmic web where the evaporative break-up circuit pattern is not present over all or substantially all of a planar surface area of the filmic web.

In one aspect, the separate conductive bodies of the filmic web are configured to permit electromagnetic waves that are wirelessly communicated with radio frequency identification (RFID) devices disposed inside the individual cards through the intermediate filmic layer.

In one aspect, the filmic web has a reflective mirror surface.

In one embodiment, a method (e.g., for forming a card from a laminate composite assembly) includes coupling a first laminated core stock sheet to a radio frequency identification (RFID) inlay layer and a second laminated core stock sheet to form the laminate composite assembly. The method also includes cutting one or more individual cards from the laminate composite assembly. The first laminated core stock sheet includes an intermediate filmic layer having plural conductive bodies spaced apart from each other. The filmic layer provides at least one of a security feature, a decorative feature, or other functional feature of the one or more individual cards. The one or more individual cards are cut from the laminate composite assembly such that the conductive bodies in the filmic layer in the one or more individual cards do not form a conductive pathway between two or more outer edges of the one or more individual cards.

In one aspect, each of the one or more individual cards is cut from the laminate composite assembly such that the individual card includes at least two of the conductive bodies in the filmic layer.

In one aspect, each of the one or more individual cards is cut from the laminate composite assembly such that the individual card includes a single conductive body in the filmic layer. The single conductive body of the individual card spaced apart from the outer edges of the individual card by a nonconductive border.

In one aspect, the filmic layer is buried beneath an outer surface of the one or more individual cards by at least one mil.

In one aspect, the filmic layer is buried beneath an outer surface of the one or more individual cards by at least two mils.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. § 112(f), and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," '

The invention claimed is:

1. A laminated core stock sheet for use in a composite laminate assembly for being separated into plural individual cards, the laminated core stock sheet comprising:
   a core substrate layer; and
   an intermediate filmic layer coupled to the core substrate layer, the intermediate filmic layer including plural conductive bodies arranged in a repeating pattern and that provide at least one of a security feature, a decorative feature, or other functional feature of the individual cards, wherein the plural conductive bodies are spaced apart from each other within the intermediate filmic layer such that the plural conductive bodies prevent conduction of electrostatic discharge through the intermediate filmic layer and outside of the individual cards.

2. The laminated core stock sheet of claim 1, wherein the plural conductive bodies are laterally spaced apart from each other in two or more directions of a plane within the intermediate filmic layer.

3. The laminated core stock sheet of claim 1, wherein the plural conductive bodies are arranged in the repeating pattern within the intermediate filmic layer over all or substantially all of a planar surface area of the core substrate layer.

4. The laminated core stock sheet of claim 1, wherein the intermediate filmic layer has a reflective mirror surface.

5. The laminated core stock sheet of claim 1, wherein spacing between the plural conductive bodies of the intermediate filmic layer permits wirelessly communicated electromagnetic waves through the intermediate filmic layer.

6. The laminated core stock sheet of claim 5, wherein the intermediate filmic layer does not inhibit the electromagnetic waves having sub-gigahertz frequencies from passing through the intermediate filmic layer.

7. The laminated core stock sheet of claim 1, wherein the plural conductive bodies of the intermediate filmic layer are disposed in and spaced apart from each other in a plane that is parallel to the core substrate layer and within the intermediate filmic layer.

8. A composite laminate assembly for being separated into plural individual cards, the assembly comprising:
a first laminated core stock sheet including a first core substrate layer and a first intermediate filmic layer coupled to the first core substrate layer, the first intermediate filmic layer including plural conductive bodies arranged in a repeating pattern that separates the plural conductive bodies from each other, the first intermediate filmic layer providing at least one of a security feature, a decorative feature, or other functional feature of the individual cards;
a second laminated core stock sheet including at least a second core substrate layer, wherein the first laminated core stock sheet and the second laminated core stock sheet are configured to be laminated together;
a first overlay layer configured to be coupled with the first laminated core stock sheet such that the first intermediate filmic layer is disposed between the first core substrate layer and the first overlay layer; and
a second overlay layer configured to be coupled with the second laminated core stock sheet such that the first and second laminated core stock sheets are disposed between the first overlay layer and the second overlay layer,
wherein the plural conductive bodies are spaced apart from each other within the first intermediate filmic layer such that the plural conductive bodies prevent conduction of electrostatic discharge (ESD) through the first intermediate filmic layer and outside of the individual cards.

9. The composite laminate assembly of claim 8, wherein the plural conductive bodies of the first intermediate filmic layer are laterally spaced apart from each other in two or more directions within a plane of the first intermediate filmic layer.

10. The composite laminate assembly of claim 8, wherein the first overlay layer includes an outer surface and an opposite surface, and wherein the first intermediate filmic layer is coupled to the opposite surface.

11. The composite laminate assembly of claim 8, wherein the plural conductive bodies are separated from the outer surface of the first overlay layer by at least one mil.

12. The composite laminate assembly of claim 8, wherein the plural conductive bodies are arranged in the regular pattern that extends over all or substantially all of planar surface areas of the first laminated core stock sheet and the first overlay layer.

13. The composite laminate assembly of claim 8, wherein the first intermediate filmic layer has a reflective mirror surface.

14. The composite laminate assembly of claim 8, further comprising a radio frequency identification (RFID) inlay layer disposed between the first laminated core stock sheet and the second laminated core stock sheet, the RFID inlay layer including one or more RFID devices.

15. The composite laminate assembly of claim 14, wherein the plural conductive bodies of the first intermediate filmic layer permit electromagnetic waves communicated with the RFID device to wirelessly pass through the first intermediate filmic layer.

16. The composite laminate assembly of claim 15, wherein the first intermediate filmic layer permits the electromagnetic waves having sub-gigahertz frequencies to pass through the first intermediate filmic layer.

17. The composite laminate assembly of claim 15, wherein the plural conductive bodies of the first intermediate filmic layer are laterally spaced apart from each other within a plane that is parallel to the first core substrate layer.

18. The composite laminate assembly of claim 8, wherein the second laminated core stock sheet also includes a second intermediate filmic layer coupled to the second core substrate layer, the second intermediate filmic layer including plural conductive bodies spaced apart from each other that also provide at least one of a security feature, a decorative feature, or other functional feature of the individual cards.

19. The laminated core stock sheet of claim 1, wherein the plural conductive bodies in the intermediate filmic layer are spaced apart from each other in the intermediate filmic layer such that no conductive pathway extends between two or more of the conductive bodies.

20. The composite laminate assembly of claim 8, wherein the plural conductive bodies in the first intermediate filmic layer are spaced apart from each other such that no conductive pathway extends between two or more of the conductive bodies.

21. The laminated core stock sheet of claim 1, wherein the intermediate filmic layer also includes an emboss coating layer having the plural conductive bodies coupled with the emboss coating layer.

22. The laminated core stock sheet of claim 1, wherein the plural conductive bodies are arranged in the repeating pattern within the intermediate filmic layer over less than all of a planar surface area of the core substrate layer.

23. The composite laminate assembly of claim 8, wherein the first intermediate filmic layer also includes an emboss coating layer having the plural conductive bodies coupled with the emboss coating layer.

\* \* \* \* \*